FLUX SENSITIVE MAGNETIC TRANSDUCER WITH AUTOMATIC GAIN CONTROL

Filed Oct. 30, 1961 2 Sheets-Sheet 1

DONALD A. PETTENGILL
INVENTOR.
BY Nathan N. Kallman
ATTORNEY

FLUX SENSITIVE MAGNETIC TRANSDUCER WITH AUTOMATIC GAIN CONTROL

Filed Oct. 30, 1961

2 Sheets-Sheet 2

DONALD A. PETTENGILL
INVENTOR.

BY Nathan N. Kallman

ATTORNEY

United States Patent Office 3,242,269

Patented Mar. 22, 1966

3,242,269

FLUX SENSITIVE MAGNETIC TRANSDUCER WITH AUTOMATIC GAIN CONTROL

Donald A. Pettengill, Palo Alto, Calif., assignor to Ampex Corporation, Redwood City, Calif., a corporation of California Filed Oct. 30, 1961, Ser. No. 148,473
5 Claims. (Cl. 179—100.2)

Figures 1, 2:
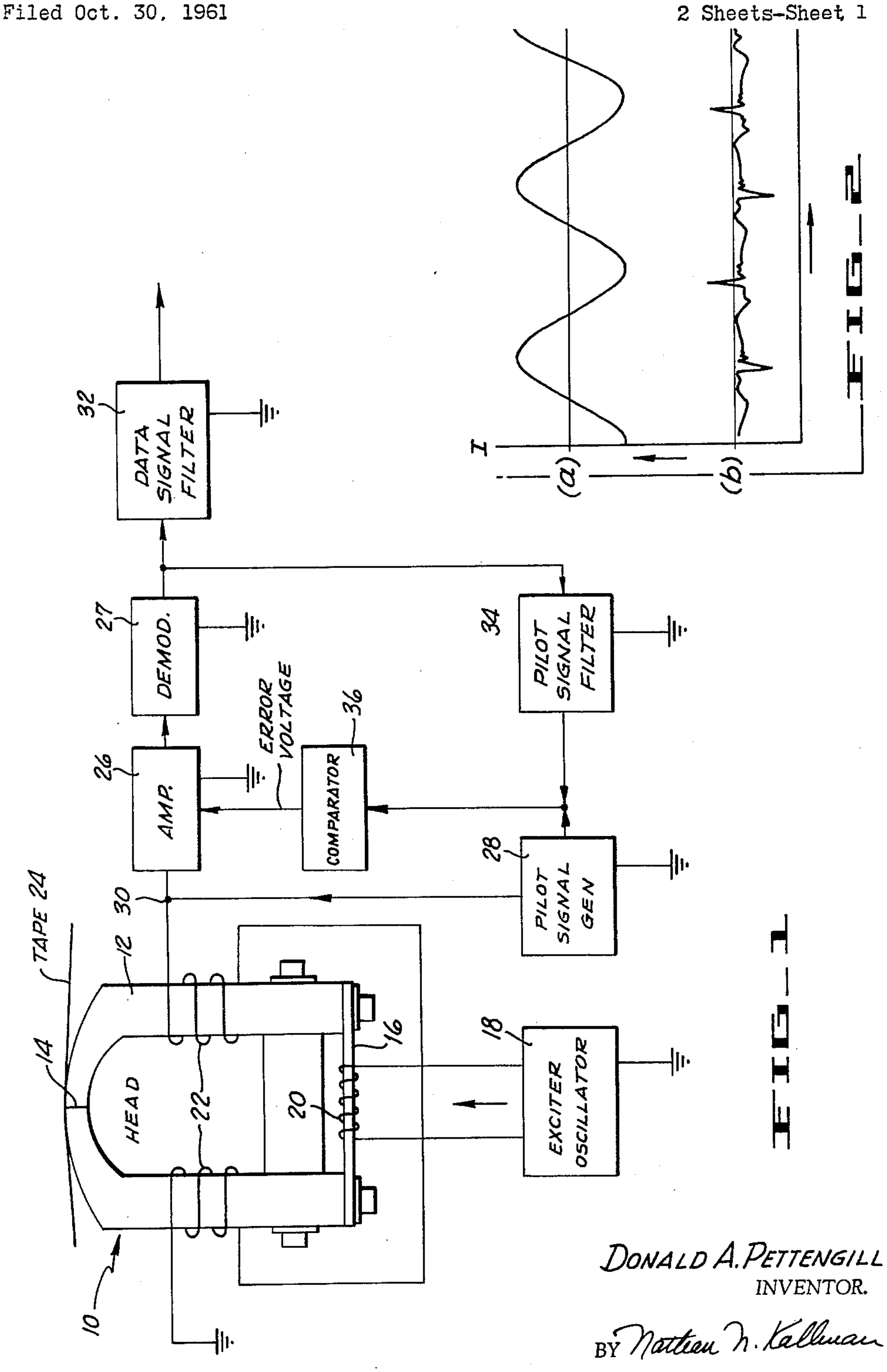

This invention relates to a magnetic reproduce system, and in particular to a system incorporating a flux responsive reproduce transducer wherein automatic gain control and stabilization of the magnetic circuit associated with the transducer are provided.

Conventional magnetic transducers or heads are generaly used to reproduce information that is recorded on a magnetic medium or tape by sensing the rate of change of flux representing the recorded signal. This requires that the recorded magnetic tape be moved relative to the magnetic head to cause signal voltages to be induced in the output windings coupled to the head. However, it is known that whenever the recorded signal has very little variation with respect to time, such as occurs with low frequency signals or when reproducing at low speeds, the corresponding rate of flux change in the magnetic head may result in either a very low output voltage that is not usable, or no output voltage at all. Therefore, equalizing circuits are employed in magnetic tape apparatus to provide a more uniform response throughout a signal frequency spectrum during the reproduce mode, thus adding to the expense and maintenance of the system, in addition to introducing new problems such as noise and hum.

To circumvent these problems, a magnetic reproduce transducer that detects the magnitude of the recorded signal flux instead of the rate of change of flux has been developed. Such flux responsive transducers are especially applicable in the field of low frequency measurements, industrial control, computers, and other magnetic memory devices.

The magnetic circuit associated with flux responsive or flux sensitive reproduce transducers, also known as magnetic modulators, is similar to that of the conventional reproducing head. During the reproduction process, flux from a recorded tape is caused to pass through a suitably shaped magnetic core of low reluctance. In contrast to the conventional head, the magnetic path includes a thin strip of magnetic material at the rear of the core around which is wound an excitation coil. Power from an oscillator operating at a frequency that is greater than the highest recorded signal frequency is applied to the excitation coil, and the thin strip is magnetically saturated. In the absence of polarizing signal flux from the tape, the flux in the core and in the thin strip has a symmetrical waveform containing no even harmonic components. On the other hand, polarization by a signal recorded on the tape affects the symmetry of the B-H loop and introduces even harmonic signal components into the flux waveform, the amplitude of these components being a function of the degree of polarization. Only the second harmonic signal component need be processed in the output circuit in order to reproduce the originally recorded signal information.

However, spurious variations in the magnetic circuit would detrimentally affect the output voltage so that the reproduced information is not accurate. Such variations may arise as a result of changes in temperature, changes in dimension of the transducer material, variations in the magnetic properties of the material, and the like. These changes tend to vary the reluctance of the transducer, and thus the flux available from the recorded tape would be erratically transduced. It would be desirable to correct for such error in the magnetic circuit so that the instantaneous accurate replica of the recorded signal may be obtained.

An object of this invention is to provide a magnetic modulator assembly that provides a true reproduction of recorded signal information.

Another object of this invention is to provide an improved magnetic transducing system that reproduces signals of low frequency without loss of signal response.

In accordance with this invention, a magnetic reproduce assembly utilizes a flux sensitive transducer in conjunction with an automatic gain control circuit to provide an output accurately representative of recorded signal information. At the flux sensitive transducer, a pilot signal is added to the information signal, and the combined signals are modulated, amplified, and detected together. The demodulated signals are then separated, and the pilot signal portion is compared to a reference signal to provide an error voltage. The error voltage is utilized to control the gain of the amplifier that receives the combined modulated information and pilot signals prior to detection. In this manner, compensation is provided for spurious variations in the magnetic circuit associated with the transducer.

Figure 3:
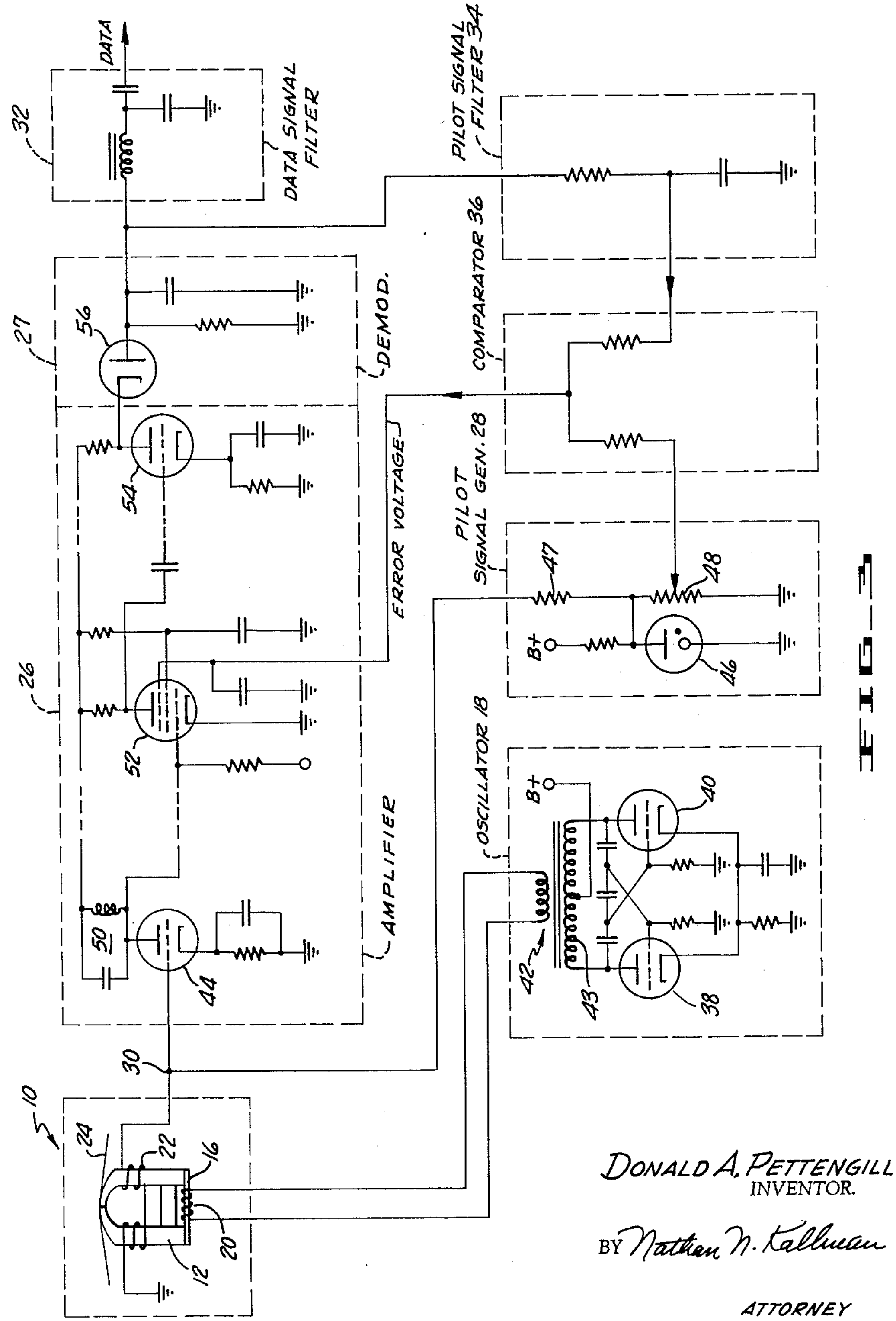

The invention will be described in greater detail with reference to the drawing in which:

FIGURE 1 is a schematic and block diagram of a magnetic reproduce assembly of the flux sensitive type and an associated electronics system, in accordance with the invention;

FIGURES 2*a*–*b* are waveforms showing the operation of the system of this invention; and FIGURE 3 is a schematic circuit diagram related to the system of FIGURE 1.

In FIGURE 1, a flux sensitive head 10 comprises a magnetic core 12 having a nonmagnetic gap 14 disposed at its face, and a thin strip of magnetic material 16 located at its rear. An exciter oscillator 18 provides a signal of known frequency, such as 12.5 kilocycles for example, to an exciter winding 20 coupled to the strip 16. The exciter signal, which may be a square wave or sine wave signal as shown in FIGURE 2(*a*), causes alternate magnetic saturation and nonsaturation of the thin strip 16 that serves to produce an alternating voltage that appears across output signal coils 22 coupled to each leg of the core 12. When there is no polarizing signal flux such as may be provided by a recorded signal from a magnetic tape 24 disposed adjacent to the gap 14, the flux signal developed in the core 12 has a substantially symmetrical waveform, such as illustrated by FIGURE 2(*b*), and contains no even harmonic components.

However, when a recorded tape 24 is moved past the reproduce gap 14, the polarizing flux in the core 12 and the strip 16 is varied in accordance with the recorded signal, and a modulated signal is generated in the head 10. A strong second harmonic of the exciter frequency is developed across the output signal windings 22 that is representative of the recorded information signal. The head output signal containing the second harmonic component is then directed to an amplifier 26 and then detected in a demodulator 27.

At the same time, a pilot signal generator 28 supplies a pilot signal current to a junction 30 between the signal coils 22 and the amplifier 26, which current flows through the signal coils 22 producing magnetic flux in core 12. This magnetic flux is modulated in the same manner as the signal flux derived from the tape 24, so that the voltage produced in the signal coils 22 by the modulation process contains components of both the injected pilot signal, and of the information signal recorded on the tape 24. Variations which may occur in the magnetic circuit of the head 10 affect the pilot signal components and information signal components of the magnetic flux in the same manner.

After detection by the demodulator 27, the data output signal is separated from the pilot signal by suitable filters 32 and 34, respectively. The data output signal that is derived from the filter 32 is substantially free of any component of the pilot signal or any spurious signal resulting from the pilot signal including any ripple that may be developed in the data signal by use of the pilot signal. The processed pilot signal is derived from the filter 34 and fed to a comparator 36 that simultaneously receives the pilot reference signal from the generator 28. An error voltage is developed for application to gain control elements of the amplifier 26 to correct for any variations in the magnetic circuit of the transducer. Thus, the gain characteristic of the reproduce system is stabilized by use of a reference signal having a known magnetomotive force.

In FIGURE 3, the circuit diagram shows the magnetic transducer assembly 10, such as found in FIGURE 1, that receives an exciter voltage from the oscillator 18. The oscillator 18 includes a pair of triodes 38 and 40 connected in push-pull, in a well-known manner. The output signal (FIGURE 2*a*) derived from the triodes 38 and 40 is channeled to the exciter coil 20 of the transducer 10 through a transformer 42 having a B+ power supply coupled to a center tap at its primary coil 43. The transducer output signal is fed to the grid of a triode amplifier 44 through the junction 30.

At the same time, a pilot signal is derived from a voltage regulator 46 and applied to the junction 30 through an isolating resistor 47. A potentiometer 48 is connected to the output electrode of the regulator 46 so that the voltage of the pilot reference signal that is used in the comparator 36 may be properly set.

The modulated information and pilot signals that appear at the junction 30 are amplified by the triode 44 and are passed through a tuning stage or filter 50 connected to the anode of the triode 44. The filtered signal is further amplified by a pentode 52 and a triode amplifier 54 prior to detection by a diode 56.

The demodulator output is then applied respectively to filter circuits 32 and 34 to separate the information signal and processed pilot signal. The pilot reference signal that is derived from the regulator 46 through the potentiometer 48 is also applied to the comparator 36 for comparison with the pilot signal that has been processed through the amplifier 26, demodulator 27 and filter 34. Any error voltage that is developed is applied to the gain element or suppressor grid of the pentode 52 to vary its transconductance and to adjust the gain characteristic thereof in such manner as to reduce the error voltage. Thus, the closed loop automatic gain control circuit that includes the comparator 36 and the pentode 52 serves to stabilize the overall gain of the magnetic reproduce system, from the magnetic circuit associated with the transducer 10 to the output of the demodulator 27.

It is noted that the pilot signal may be a direct current signal whereby a low frequency information signal, not including direct current data, may be processed. When using a direct current pilot signal, high loop gain may be realized. Alternatively, an alternating current pilot signal may be employed having a frequency above the frequency bandwidth of the data signal being processed. In any event, the pilot signal should lie in a portion of the spectrum other than the frequency bandwidth of the information signal. For example, the pilot signal may have a frequency of 1500 cycles per second, the data signal bandwidth may extend from D.C. to 500 cycles per second, and the exciter signal frequency may be 12.5 kilocycles per second. Furthermore, the pilot signal may be supplied by a generator, as utilized in the inventive system, as described heretofore, or may be recorded directly on the magnetic tape or medium.

Also, when recording signals of varying amplitude such as musical presentations, the dynamic range of the magnetic recording and reproducing system is generally limited by tape noise and third harmonic distortion, among other things. To increase the dynamic range, the pilot signal may be first recorded on the magnetic tape in conjunction with the intelligence signal. Then, as the amplitude of the recorded signal is varied, the amplitude of the recorded pilot signal is also varied. During the playback mode, the pilot signal may thus be used for controlling the gain of the reproduced signal with a resultant improved signal-to-noise ratio. To effectuate this result, a compandor or system employing signal amplitude range compression during recording and correlated signal amplitude range expansion during playback may be introduced into the system.

In addition, the pilot signal may be employed as a sampling signal when recording and reproducing pulse information or non-continuous information spaced in time. The pilot signal would be applied only in the absence of input information during recording, and during playback would be referenced for gain control purposes. It is seen that the inventive concept may be applied in several manners, and the scope of the invention should not be considered limited only to the embodiment described heretofore.

There has been described herein a magnetic reproduce assembly and system for low frequency signal processing or low tape speed application wherein the output signal derived from the magnetic modulator or flux sensitive head is coupled to an automatic gain control circuit that provides compensation for spurious variations in the magnetic circuit associated with the head, thereby affording stabilized gain, increased output voltage, and a better signal-to-noise ratio.

What is claimed is:

1. A magnetic reproduce system for processing signals of relatively low frequency comprising: a magnetic transducer having a nonmagnetic gap and signal windings coupled thereto; means for applying an exciter frequency signal to said transducer to develop a flux therein; means including said gap for transducing a recorded signal so that magnetic flux representative of such recorded signal is developed in said transducer; means for applying a pilot signal to said windings to develop additional magnetic flux for combination with the flux representative of the recorded signal; means for deriving an output signal from said transducer corresponding to the combined magnetic flux and containing record information and compensation information from said transducer; and closed loop automatic gain control circuit means coupled to said magnetic transducer and said output signal deriving means for comparing the compensation information portion of the output signal with a reference signal to obtain an error signal for stabilizing the gain characteristic of said reproduce system.

2. A magnetic reproduce system for processing signals of relatively low frequency comprising: a flux sensitive magnetic transducer having a nonmagnetic gap and signal coils coupled thereto; means for applying an exciter frequency signal to said transducer; means for applying a recorded signal to said transducer to develop magnetic flux representative of said recorded signal in the transducer; means for applying a pilot signal to said coils to develop additional magnetic flux to be combined with the flux developed from the recorded signal; an output circuit including an automatic gain control loop means coupled to the magnetic transducer for deriving an output signal representative of the recorded and pilot signals; means for separating said pilot signal from said output signal; means for comparing the separated pilot signal to a reference signal to develop an error signal; and means for applying said error signal to said gain control loop means to stabilize the gain characteristic of the reproduce system.

3. A magnetic reproduce system for processing signals of relatively low frequency comprising: a flux sensitive magentic transducer having a nonmagnetic gap and signal coils coupled thereto; means for applying a recorded signal to said transducer to develop magnetic flux representative of said recorded signal in the transducer; means for applying an exciter signal to said transducer, said exciter signal having a frequency displaced from the frequency range of the recorded signal; means for applying a pilot signal to said coils to develop additional magnetic flux to be combined with the flux developed from the recorded signal; an output circuit comprising detection and amplification means including an automatic gain control loop means coupled to the magnetic transducer for deriving an output signal representative of the recorded and pilot signals; filter means for separating the detected pilot signal from said output signal; means for comparing the separated pilot signal to a pilot reference signal to develop an error signal; and means for applying said error signal to said gain control loop means to stabilize the gain characteristic of the reproduce system.

4. A magnetic reproduce system for processing signals of relatively low frequency comprising: a flux sensitive magnetic transducer having a nonmagnetic gap, a thin strip of magnetic material and signal coils coupled thereto; an oscillator for supplying an exciting frequency signal to said thin strip; means for applying a recorded information signal to said transducer to develop magnetic flux representative of said recorded signal in the transducer; means for applying a pilot signal to said coils to develop additional magnetic flux to be combined with the flux developed from the recorded signal; amplification and detection means including an automatic gain control device coupled to the magnetic transducer for deriving an output signal representative of the recorded information and pilot signals; filter means coupled to the amplification and detection means for separating the detected pilot signal from the information signal; a comparator for comparing the separated pilot signal with a reference signal to develop an error signal; and means for applying such error signal to the automatic gain control device to stabilize the gain characteristic of the reproduce system.

5. A magnetic reproducing system comprising: a magnetic recording medium; a magnetic reproduce head assembly including a core having a section that is readily saturated; a gap in said core for transmitting a record information flux signal from said recording medium to said core; an exciter means for applying a flux to said core; a pilot signal generator means for applying a compensation flux signal to said core; an amplification and demodulator means for deriving an output signal containing record information and compensation information from said core, for amplifying said output signal and for detecting said record information and said compensation information of said output signal; a data signal filter means for transmitting said record information of said output signal, a pilot signal filter means for transmitting said compensation information of said output signal; a comparator means for comparing the signal of said pilot signal generator means with the signal transmitted by said pilot signal filter means and for altering the operation of said amplification and demodulator means in accordance with the result of said comparison to compensate at least for variations in said core.

References Cited by the Examiner

UNITED STATES PATENTS

| | | | |
|---|---|---|---|
| 2,279,018 | 4/1942 | Wolfe | 179—100.2 |
| 2,425,213 | 8/1947 | Sunstein | 179—100.2 |
| 2,497,883 | 2/1950 | Harris | 330—137 X |
| 2,781,423 | 2/1957 | Kuczun et al. | 330—137 X |
| 2,855,464 | 10/1958 | Wiegand | 179—100.2 |
| 3,005,878 | 10/1961 | Wiegand | 179—100.2 |
| 3,011,160 | 11/1961 | Gratian | 179—100.2 |
| 3,041,415 | 6/1962 | Gratian | 179—100.2 |

BERNARD KONICK, *Primary Examiner.*